(12) United States Patent  (10) Patent No.: US 8,512,151 B1
Mkrtchyan  (45) Date of Patent: Aug. 20, 2013

(54) INTEGRATION OF BOARD GAMES AND TOUCH SCREEN DEVICES

(75) Inventor: Armen Mkrtchyan, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/419,353

(22) Filed: Mar. 13, 2012

(51) Int. Cl.
*A63F 13/00* (2006.01)

(52) U.S. Cl.
USPC ............................................ 463/43; 273/237

(58) Field of Classification Search
USPC ...................... 463/31–43; 345/175; 273/237
See application file for complete search history.

(56) References Cited

U.S. PATENT DOCUMENTS

| | | | |
|---|---|---|---|
| 5,853,327 A * | 12/1998 | Gilboa | 463/39 |
| 6,396,777 B1 * | 5/2002 | Thomas | 369/30.24 |
| 6,525,252 B1 * | 2/2003 | Klausen et al. | 84/600 |
| 2003/0001813 A1 * | 1/2003 | Sekiguchi | 345/96 |
| 2004/0048642 A1 * | 3/2004 | Kinzer et al. | 463/1 |
| 2006/0175753 A1 * | 8/2006 | MacIver et al. | 273/237 |
| 2010/0235794 A1 * | 9/2010 | Ording | 715/863 |
| 2011/0316767 A1 * | 12/2011 | Avrahami | 345/156 |
| 2012/0007817 A1 * | 1/2012 | Heatherly et al. | 345/173 |
| 2012/0254479 A1 * | 10/2012 | Matsuoka | 710/16 |

* cited by examiner

*Primary Examiner* — Masud Ahmed
(74) *Attorney, Agent, or Firm* — Farjami & Farjami LLP

(57) ABSTRACT

In accordance with one implementation disclosed in the present application, an electronically integrated board game includes a game board having an overlapping region that is configured to cover a touch screen of an electronic device. The game board also includes a touch input interface configured to route a touch input from a play area of the game board to the touch screen of the electronic device through the overlapping region. The game board can also include an opening configured to expose the touch screen of the electronic device. The overlapping region can surround an opening of the game board, where the opening is configured to expose the touch screen of the electronic device.

15 Claims, 5 Drawing Sheets

INTEGRATION OF BOARD GAMES AND TOUCH SCREEN DEVICES

BACKGROUND

Board games continue to serve as a source of entertainment for families and friends. Over the years, board games have attempted to integrate electronics into game play. However, in order to offer the board games at prices that are attractive to consumers, the board games often have had limited electronic integration. For example, expensive electronics must often be sold as a part of the board games.

At the same time touch screen devices are becoming increasingly prevalent in the marketplace. These touch screen devices typically offer a touch sensitive surface over a display and can detect the presence and position of touch input, opening up the possibility of new ways to interact with electronic devices. As examples, the popularity of recent touch screen devices, such as iPad® from Apple® and various Google Android™ devices, means that touch screen devices can be found among many households.

Board games have been simulated on touch screen devices as completely electronic board games. For example, Apple's App Store offers a version of Monopoly® that can be played entirely electronically on the iPad. However, despite such advancements, there is still a strong market for more traditional board game experiences. For example, small displays and lack of physical game pieces and/or game boards can detract from the enjoyment provided by board game experiences.

SUMMARY

The present disclosure is directed to integration of board games and touch screen devices, substantially as shown in and/or described in connection with at least one of the figures, as set forth more completely in the claims.

DETAILED DESCRIPTION OF THE INVENTION

Figure 1A:
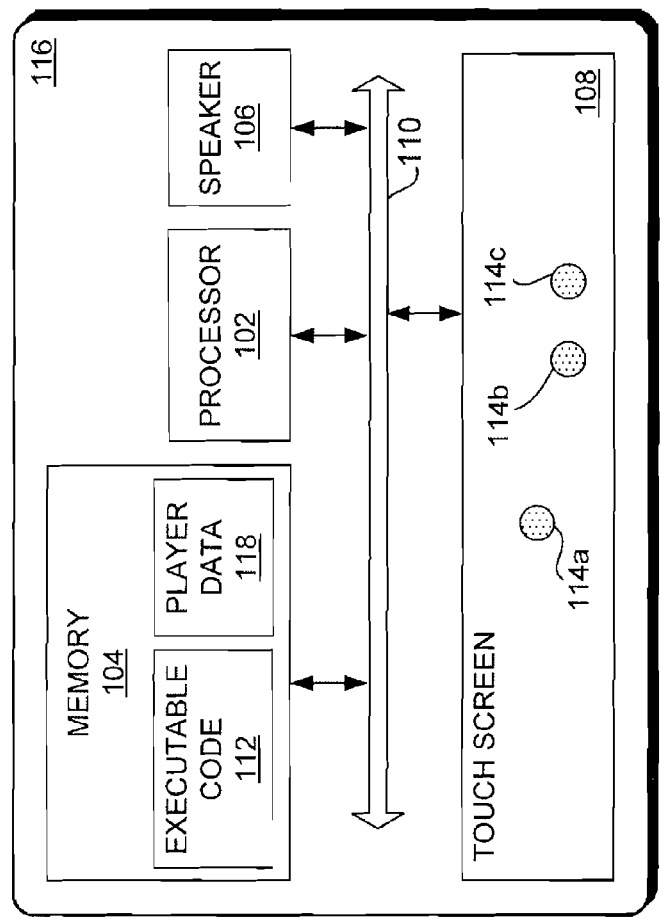
FIG. 1A presents an exemplary diagram of a electronic device of an electronically integrated board game, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary diagram of electronic device 100, according to one implementation of the present disclosure. In various implementations, electronic device 100 is part of an electronically integrated board game. FIG. 1A shows electronic device 100 having processor 102, memory 104, speaker 106 (optional), and touch screen 108, and bus 110. Processor 102, memory 104, speaker 106, touch screen 108, and bus 110 are within housing 116 of electronic device 100.

In the present implementation, processor 102, memory 104, speaker 106, and touch screen 108 can communicate with each other over bus 110. However, bus 110 is exemplary and in various implementations, processor 102, memory 104, speaker 106, and touch screen 108 can communicate with each other over other means, for example, a plurality of dedicated lines, or a combination of buses and dedicated lines. Furthermore, electronic device 100 can include many different components and configurations, and is simplified so as to not obscure inventive concepts disclosed herein.

Also in the present implementation, electronic device 100 is a touch screen device, and more particularly a tablet computer, such as an iPad from APPLE®. However, in various implementations, electronic device 100 need not be a tablet computer.

Processor 102 can include, as one specific example, a central processing unit (CPU). Processor 102 is configured to operate in accordance with executable code 112 stored in memory 104. Executable code 112 includes, for example, instructions for processor 102 to execute in order present at least a portion of an electronically integrated board game on electronic device 100. In some implementations, as shown FIG. 1A, memory 104 also includes player data 118, which is related to one or more players of the electronically integrated board game being presented by electronic device 100. For example, player data 118 can comprise player scores, positioning of player game pieces on a game board of the electronically integrated board game, and/or other data associated with one or more players of the electronically integrated board game. Memory 104 can include, as examples, random access memory (RAM) and/or read only memory (ROM). In some implementations, for example, memory 104 includes registers of processor 102. Memory 104 can include one or more banks of memory and one or more types of memory, which can be located remotely from one another.

In electronic device 100, processor 102 is configured to detect at least one touch input on touch screen 108. For example, FIG. 1A shows processor 102 detecting touches 114a, 114b, and 114c (also referred to individually or collectively as "touch input 114"). In the present implementation, touch screen 108 uses charge variation to sense touch input 114. Also in the present implementation, touch screen 108 is a capacitive touch screen. Touch input 114 can be detected by providing a grounding path to touch screen 108. For example, a finger can provide the grounding path to touch screen 108. Also, in some implementations, one or more electronic devices provide the grounding path to touch screen 108. The grounding path can also include a stylus, a game piece, and/or other constituents.

Over the years, board games have attempted to integrate electronics into game play. However, in order to offer the board games at prices that are attractive to consumers, the board games often have had limited electronic integration. For example, expensive electronics must often be sold as a part of the board games. At the same time, electronic devices having touch screens, such as electronic device 100, are becoming increasingly prevalent in the marketplace. As one example, the popularity of recent touch screen devices, such as iPad from APPLE®, means that touch screen devices can be found among many households. In accordance with some implementations disclosed in the present application, electronic devices having at least one touch screen, such as electronic device 100, are electronically integrated with board games. As such, in some implementations, board games can have robust interactivity without requiring expensive electronics to be sold as a part of the board games.

Figure 1B:
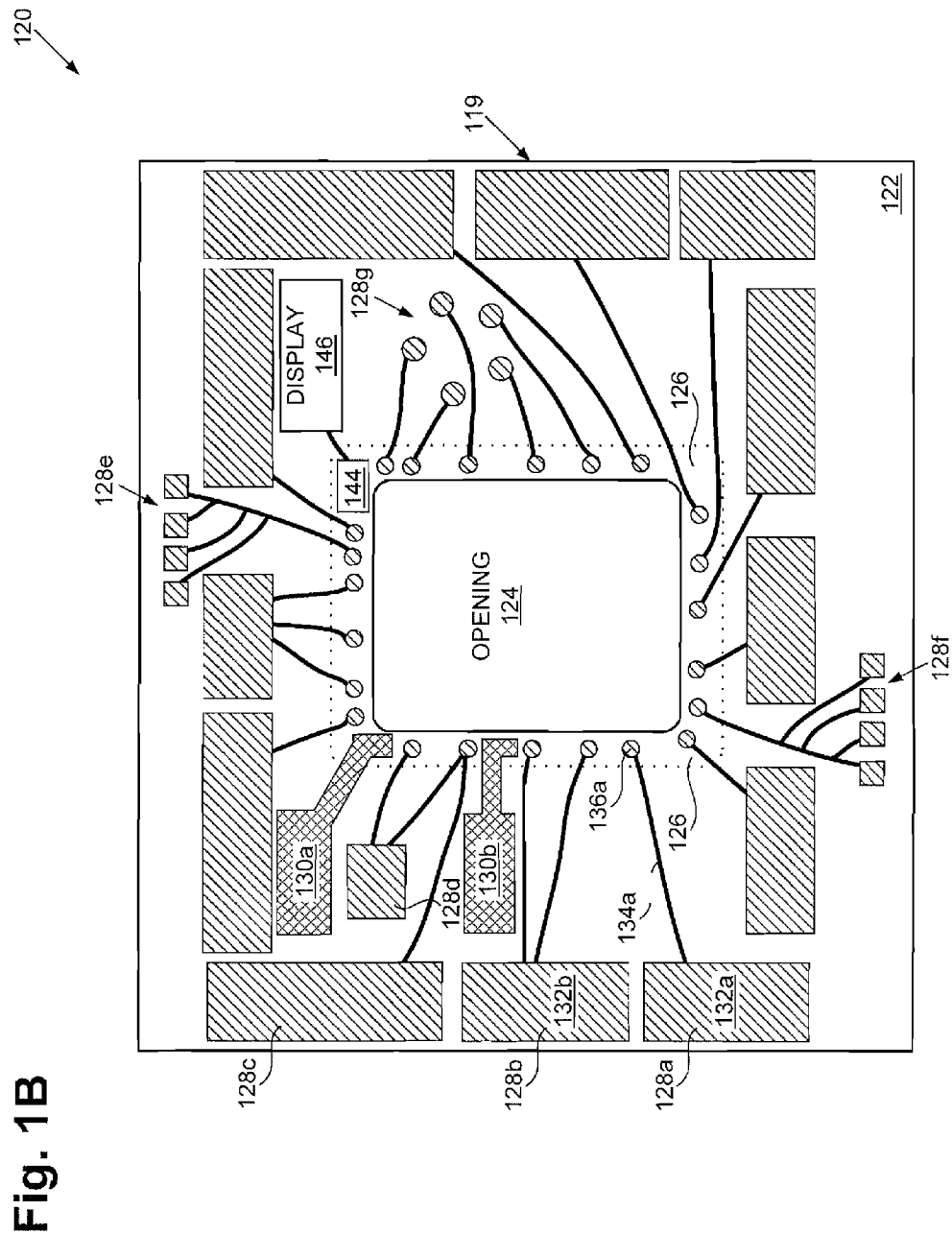
FIG. 1B presents a top view of a portion of a game board of an electronically integrated board game, according to one implementation of the present disclosure.

FIG. 1B presents a top view of a portion of a game board, according to one implementation of the present disclosure. More particularly, FIG. 1B shows touch input interface section 119 of game board 120. Touch input interface section 119 of game board 120, and more generally game board 120, can include different sub portions and sub materials, which are not specifically shown for clarity. Furthermore, touch input interface section 119 of game board 120, and more generally game board 120, can vary widely from the shapes, dimensions, and configurations shown herein.

Game board 120 includes play area 122, opening 124, and overlapping region 126. Game board 120 also includes a plurality of touch input interfaces, of which only touch input interfaces 128*a*, 128*b*, 128*c*, 128*d*, 128*e*, 128*f*, and 128*g* are individually labeled for clarity. The plurality of touch input interfaces are also referred to collectively as touch input interfaces 128. Game board 120 further includes light interface 130*a*, solar cell 144, and display 146.

Figure 1C:
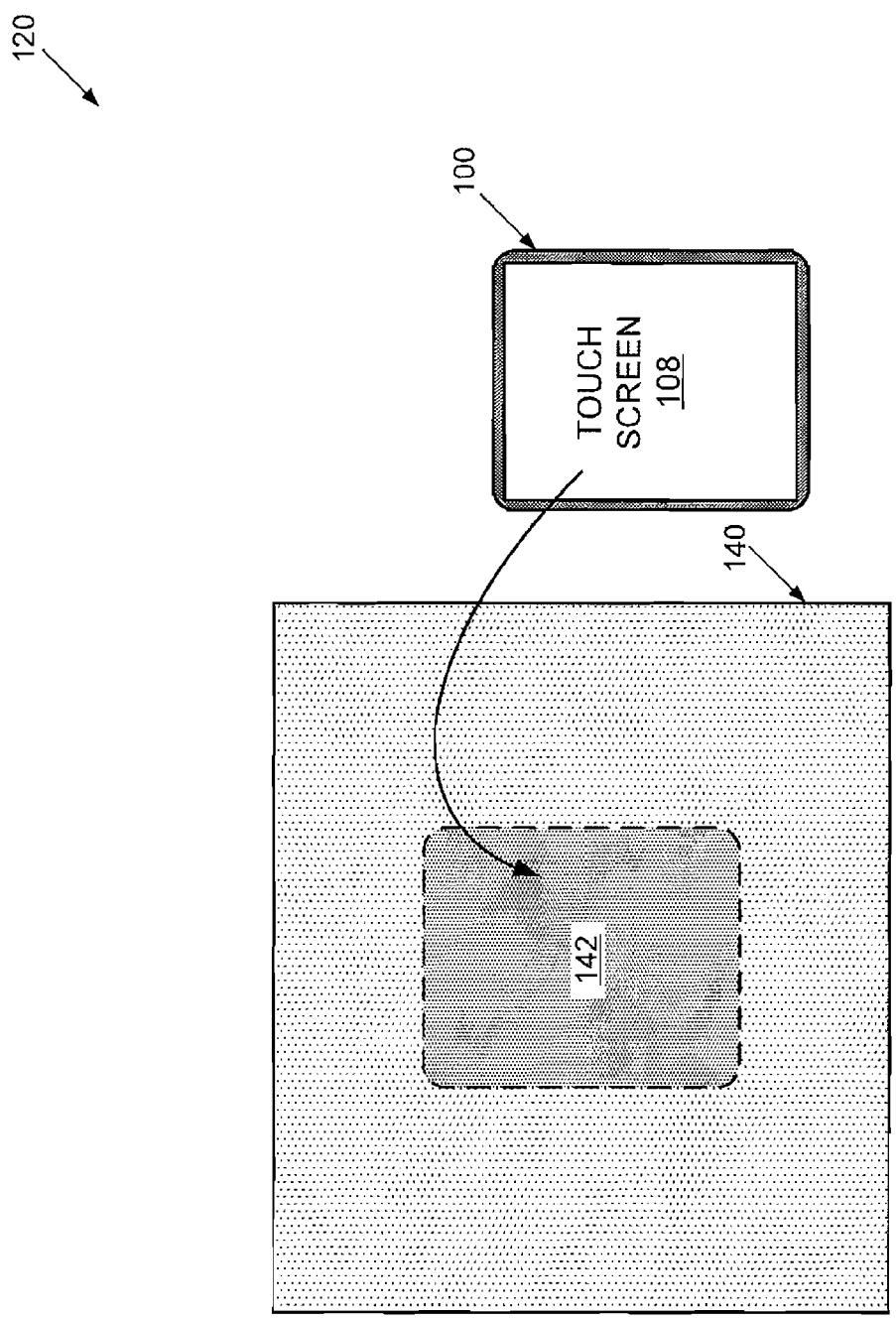
FIG. 1C presents a top view of a portion of a game board of an electronically integrated board game, according to one implementation of the present disclosure.
Figure 1D:
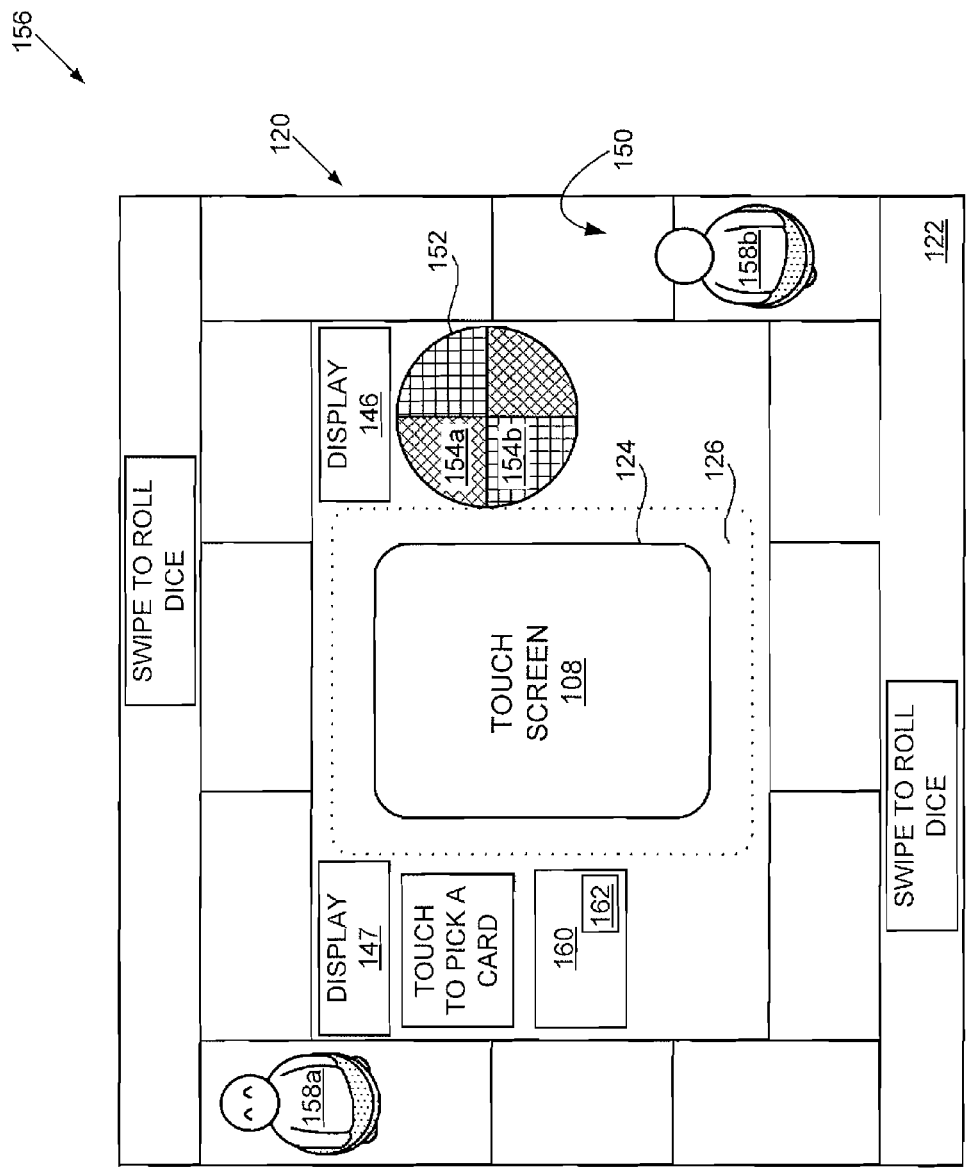
FIG. 1D presents a top view of an electronically integrated board game, according to one implementation of the present disclosure.

In the present implementation, overlapping region 126 is configured to cover at least a portion of touch screen 108 of electronic device 100 and is indicated by a dotted outline. Opening 124 is further configured to expose (visibly expose) touch screen 108 of electronic device 100. For example, FIG. 1D shows electronically integrated board game 156 having overlay 150, which is situated over touch input interface section 119, in accordance with some implementations of the present disclosure. Overlay 150 shows overlapping region 126 covering a portion of touch screen 108 of electronic device 100 and further shows opening 124 exposing touch screen 108 of electronic device 100. Thus, in FIG. 1D, touch screen 108 is partially covered by overlapping region 126 and is partially exposed by opening 124. Opening 124 may completely expose touch screen 108 in some implementations. Furthermore, overlapping region 126 completely covers touch screen 108 in some implementations.

In some implementations, game board 120 includes cardboard or plastic and opening 124 is formed from a cutout of the cardboard or plastic. However, opening 124 does not have to be a physical opening, such as a cutout in game board 120. For example, opening 124 can include a transparent and/or translucent region of game board 120 that can form a window to at least partially expose touch screen 108. As another example, opening 124 can also be formed by a combination of at least the transparent and/or translucent region and a physical opening. However, it is noted that in some implementations, game board 120 does not include opening 124. In the present implementation, overlapping region 126 forms opening 124 and surrounds opening 124. Also in the present implementation, play area 122 surrounds opening 124 and overlapping region 126. However, one or both of opening 124 and overlapping region 126 can be elsewhere, such as on a side or edge of game hoard 120.

Additionally, game board 120 can include multiple openings and/or multiple overlapping regions. In one implementation, overlapping region 126 is configured to cover touch screen 108 so as to divide touch screen 108 into multiple display regions (not shown). For example, a portion of overlapping region 126 can divide opening 124 into multiple openings. In accordance with some implementations, processor 102 can utilize each of the multiple display regions as a separate display. For example, processor 102 can associate one of the multiple display regions with one player of game board 120 and associate another of the multiple display regions with another player of game board 120. As another example, processor 102 can utilize one of the multiple display regions to display player scores and utilize another of the multiple display regions, for example, to present a minigame or menu of an electronically integrated board game.

In the present implementation, touch input interfaces 128 are configured to route at least one touch input from play area 122 of game board 120 to touch screen 108 of electronic device 100. The at least one touch input from play area 122 corresponds, for example, to any combination of touches 114*a*, 114*b*, and 114*c* in FIG. 1A. In the present implementation, touch input interfaces 128 are configured to route at least one touch input from play area 122 of game board 120 to touch screen 108 of electronic device 100 through overlapping region 126. As such, in some implementations, touch screen 108 of electronic device 100 is configured to receive touch input (e.g. touch input 114) from play area 122 of game board 120. Furthermore, processor 102 of electronic device 100 is configured to present at least a portion of an electronically integrated board game based on the touch input from play area 122 of game board 120.

Certain approaches to integrating electronics into board games require expensive electronics to be sold as a part of the board games. For example, the expensive electronics may be required to communicate with electronic device 100. The expensive electronics may include, for example, components for communicating with electronic device 100 over Bluetooth, Wi-Fi, proprietary or standardized physical interface ports (e.g. universal serial bus), and/or other communication interfaces. In accordance with some aspects disclosed herein, by routing at least one touch input from play area 122 of game board 120 to touch screen 108 of electronic device 100, game board 120 can communicate with electronic device 100 in an electronically integrated board game without requiring expensive electronics.

Touch input interfaces 128 can include one or more materials. In various implementations, touch input interfaces 128 include electrically conductive material or materials. As such, in some implementations touch input interfaces 128 can, for example, be utilized to provide a grounding path to touch screen 108. Non-limiting examples of materials for touch input interfaces 128 include any combination of foil, conductive ink, wires, conductive polymers, conductive thread (e.g. stitching or embroidery), and conductive paint.

In the present implementation, each of touch input interfaces 128 include at least one player contact for receiving a touch input. For example, touch input interface 128*a* includes player contact 132*a*, which can take any shape, but is shown as being a rectangular pad. Player contact 132*a* is in play area 122 and is configured to receive touch input. Also in the present implementation, each of touch input interfaces 128 include at least one touch lead connecting the at least one player contact to at least one touch screen contact. For example, touch input interface 128*a* includes touch lead 134*a* connecting player contact 132*a* to touch screen contact 136*a*. Touch screen contact 136*a* provides touch input to touch screen 108 of electronic device 100.

In FIG. 1D, each touch screen contact is contacting touch screen 108 in overlapping region 126. Touch screen contact 136*a* can, for example, be on a bottom of touch input interface section 119 with player contact 132a being on a top of touch input interface section 119. It is noted that player contact 132a, touch lead 134a, and touch screen contact 136a can be made of one or more materials. In some implementations, player contact 132a, touch lead 134a, and touch screen contact 136a are contiguous and are made of one material. For example, in one specific implementation, touch input interface 128a is completely formed by depositing conductive ink on a surface of game board 120. In another example, touch input interface 128a is completely formed by patterning a conductive layer, such as foil.

In some implementations, game board 120 is configured to secure touch screen 108 to touch input interfaces 128 of game board 120. For example, game board 120 is configured to secure touch screen 108 to overlapping region 126 of game board 120. Game board 120 can include any combination of latches, screws, magnets, grooves, slots, snaps, recesses, adhesives, and suction cups to secure touch screen 108 to overlapping region 126 of game board 120. FIG. 1C shows one specific example where game board 120 includes base section 140. As shown in FIG. 1C, electronic device 100 can be placed in alignment region 142 of base section 140. Alignment region 142 can comprise, for example, a recess and/or groves. As indicated in FIG. 1C, electronic device 100 can be placed in alignment region 142 and touch input interface section 119, shown in FIG. 1B, can then be placed over and secured to base section 140.

In some implementations, overlay 150, shown in FIG. 1D, is also placed over touch input interface section 119. Overlay 150 includes visual indicia that cover at least a portion of touch input interfaces 128 of touch input interface section 119. Overlay 150 can include, for example, at least one layer of paper and/or at least one sticker. For example overlay 150 can be a paper and/or plastic sticker and can be removable. In some implementations, processor 102 associates different overlays with different electronically integrated board games. As one example, a player can select which overlay is on game board 120 using electronic device 100. Thus, in some implementations, game board 120 can easily accommodate different electronically integrated board games while reusing touch input interface section 119 and/or other constituents of game board 120. Thus, in various implementations, overlay 150 can be removably or permanently attached to touch input interface section 119. However, it is noted that game board 120 is not limited to the various configurations and arrangements described herein.

In the present implementation, touch input interface 128a is at least partially insulated from touch input through game board 120 (e.g., through overlay 150). For example, game board 120 exposes player contact 132a to touch input, but at least partially insulates touch lead 134a (or another portion of touch input interface 128a) from touch input through game board 120. In one implementation, touch lead 134a is substantially covered by insulative material. As such, processor 102 can utilize player contacts, such as player contact 132a, to distinguish between touch inputs from different regions of play area 122. For example, if game board 120 is a version of Monopoly®, processor 102 can determine that touch input from touch input interface 128a indicates a player is on the property "St. Charles Place" as opposed to touch input from touch input interface 128b indicating a player is on "Electric Company." Furthermore, visual indicia on overlay 150, such as a label, can be situated on game board 120 to visually distinguish between at least some touch input interfaces. For example, visual indicia can be situated over player contact 132a and/or player contact 132b to visually distinguish between player contact 132a and player contact 132b.

In some implementations, processor 102 of electronic device 100 is configured to present at least a portion of an electronically integrated board game based on at least one time interval between one touch input and another touch input from play area 122 of game board 120. For example, if the at least one time interval is less than or equal to a predetermined value, processor 102 can present a dice roll or other animation on touch screen 108. The touch input and the another touch input can be from one or more touch input interfaces. In some implementations, processor 102 associates the at least one time interval with a speed of a gesture by a player of electronically integrated board game 156.

As one example of the forgoing, FIG. 1B shows touch input interface 128e that includes an array of adjacent player contacts. In some implementations, a player can make a gesture, such as a swipe across the array of adjacent player contacts. Touch screen 108 of electronic device 100 can receive a plurality of touch inputs from the gesture. Furthermore, processor 102 of electronic device 100 can present at least a portion of electronically integrated board game 156 based on at least one time interval between the plurality of touch inputs. For example, processor 102 can associate the at least one time interval with a speed of the gesture by the player of the board game. As one example, processor 102 can display a wheel on touch screen 108 and the wheel can spin fast if processor 102 determines that the speed of the gesture is high (e.g. above a predetermined value) as opposed to slow fast if processor 102 determines that the speed of the gesture is low (e.g. below a predetermined value).

As another example, FIG. 1B shows touch input interface 128g that includes an array of adjacent player contacts. The array of adjacent player contacts are arranged in a circular pattern. In one implementation, a wheel or other physical object is situated over the array of adjacent player contacts. For example, FIG. 1D shows wheel 152 situated over the array of adjacent player contacts. In one implementation, wheel 152 (or another object) can provide touch input to touch screen 108 through touch input interface 128g. For example, wheel 152 can provide touch input through a subset of the array of adjacent player contacts. By doing so, in some implementations, processor 102 can determine a speed of wheel 152 as wheel 152 rotates. Also, in some implementations, processor 102 can determine whether wheel 152 has stopped on a particular region of wheel 152, which processor 102 can associate with an outcome in electronically integrated board game 156. For example, processor 102 can distinguish between region 154a and region 154b of wheel 152 based on touch input from wheel 152.

In some implementations, processor 102 is configured to associate touch input from any of touch input interfaces 128 with a multi-touch gesture. Processor 102 can then present at least a portion of electronically integrated board game 156 accordingly. For example, processor 102 is configured to determine whether touch input from any of touch input interfaces 128 matches a predetermined pattern corresponding to a multi-touch gesture. One example of a multi-touch gesture would be chords on a piano. For example, processor 102 may associate a respective one of touch input interfaces 128 with different keys of a piano and combinations of those keys as chords. Also, in some implementations, processor 102 is configured to determine whether touch input from any of touch input interfaces 128 matches a predetermined sequence of touch input. For a player could touch any combination of touch input interfaces 128 to match the predetermined sequence of touch input and, for example, processor 102 can then unlock a special item or otherwise present at least a portion of electronically integrated board game 156 accordingly.

In some implementations, game board 120 includes light interfaces 130a and 130b, shown in FIG. 1B. Light interfaces 130a and 130b are configured to route light from touch screen 108 of electronic device 100, through overlapping region 126, to play area 122 of game board 120. Although in some implementations, light interface 130a and/or 130b remains at least partially in overlapping region 126. Thus, game board 120 can, for example, have light effects without requiring discrete lighting electronics. Light interface 130a and/or 130b can comprise, for example, any combination of at least one acrylic, optical fiber, fiber optic bundle, plastic, resin, and other materials that transmit light. In one implementation, display 147, shown in FIG. 1D, is illuminated by light interface 130a. Display 147 can be, for example, over light interface 130a. In some implementations, processor 102 can control display 147, which can be a passive display, utilizing touch screen 108 of electronic device 100. For example, in some implementations, processor 102 presents images on touch screen 108 that are also presented on display 147 using light interface 130a. In some implementations, processor 102 controls light on touch screen 108 to illuminate at least a portion of display 147 using light interface 130a. For example, display 147 can include one or more transparent and/or translucent regions that are illuminated by light interface 130a to, for example, spell out a word. For example, display 147 can spell out "player one" when processor 102 determines that it is a particular player's turn in electronically integrated board game 156.

In some implementations, processor 102 is configured to transfer data to an electronic device of game board 120, such as electronic device 160, utilizing light from touch screen 108. For example, as shown in FIG. 1D, game board 120 includes photoreceptor 162 that is configured to receive light from touch screen 108 of electronic device 100. In the present implementation, photoreceptor 162 receives light from touch screen 108 through light interface 130b. Photoreceptor 162 can be, for example, situated over light interface 130b. Furthermore, electronic device 160 can utilize photoreceptor 162 to receive data transmitted from touch screen 108. Examples of the many ways in which the data can be transmitted to electronic device 160 include any combination of color variation, flashing light, and images on touch screen 108. The data can be, for example, player data 118, such as a player score, and other data.

Also in some implementations, game board 120 includes solar cell 144 shown in FIG. 1B. Solar cell 144 is configured to receive power from light emitted by touch screen 108 of electronic device 100. In the present implementation, solar cell 144 is situated in overlapping region 126 of game board 120 to receive light emitted by touch screen 108. Solar cell 144 can utilize the light to power one or more electronics on game board 120. For example, in the present implementation, solar cell 144 is configured to power display 146, which can be an active display, such as a light emitting diode (LED) display, a liquid crystal display (LCD) and an electronic paper (e-paper) display. Thus, in some implementations, processor 102 is configured to power solar cell 144 using touch screen 108 of electronic device 100.

Figure 2:
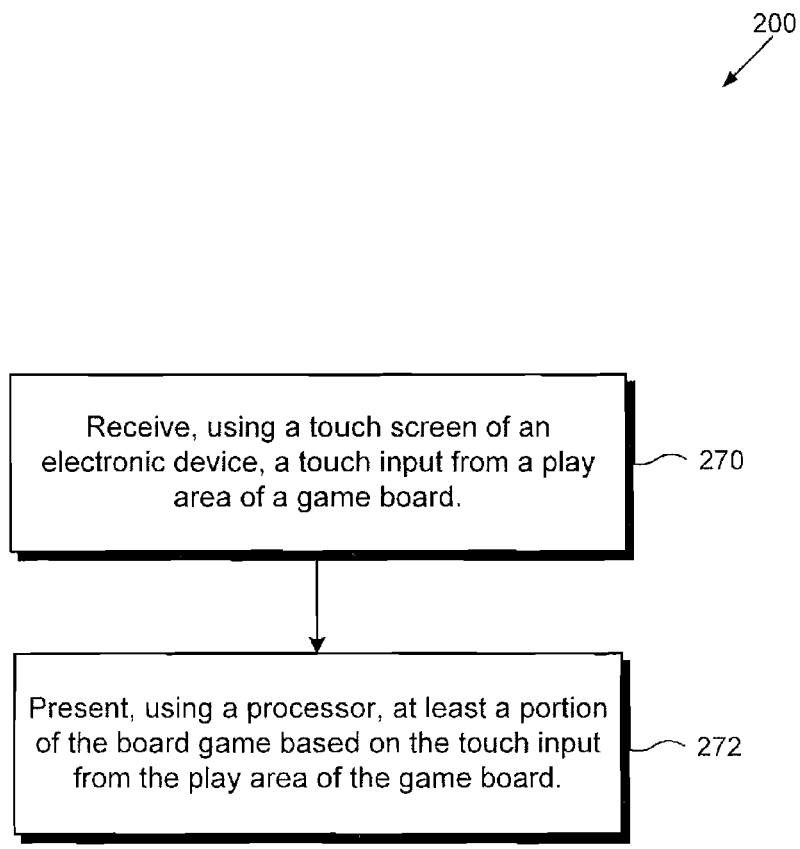
FIG. 2 shows a flowchart illustrating a method for electronically integrating a board game, according to one implementation of the present disclosure.

FIG. 2 shows flowchart 200 illustrating a method for electronically utilizing an electronically integrated board game, according to one implementation of the present disclosure. The approach and technique indicated by flowchart 200 are sufficient to describe at least one implementation of the present disclosure, however, other implementations of the disclosure may utilize approaches and techniques different from those shown in flowchart 200. Furthermore, while flowchart 200 is described with respect to FIGS. 1A, 1B, 1C, and 1D disclosed inventive concepts are not intended to be limited by specific features shown and described with respect to FIGS. 1A, 1B, 1C, and 1D. Furthermore, with respect to the method illustrated in FIG. 2, it is noted that certain details and features have been left out of flowchart 200 in order not to obscure the discussion of inventive features in the present application.

Referring now to flowchart 200 of FIG. 2, flowchart 200 includes receiving, using a touch screen of an electronic device, a touch input from a play area of a game board (action 270). For example, touch screen 108 of electronic device 100 can receive touch input 114 from play area 122 of game board 120. More particularly, in the implementation shown, electronic device 100 receives touch input 114 from at least one of one of touch input interfaces 128. As one example, a player of electronically integrated board game 156 can touch player contact 132a of touch input interface 128a to provide touch input 114 to touch screen 108 through touch lead 134a and touch screen contact 136a. As another example, a player can place game piece 158a or 158b on player contact 132a to provide touch input 114 from game piece 158a to touch input interface 128a and touch screen 108.

In some implementations, game piece 158a and/or 158b can transfer a touch from the player to player contact 132a. Also in some implementations, game piece 158a or 158b can have electronics to generate a touch without requiring a touch from the player. In some implementations, game piece 158a and/or 158b includes multiple conductive points for providing touch input to touch input interfaces 128. Furthermore, each conductive point can, for example, contact a different one of touch input interfaces 128 (e.g. through a different player contact).

In another example, a player can swipe a finger across the array of adjacent player contacts of touch input interface 128e. As another example, a player can spin wheel 152. This may be, for example, performed in response to a prompt from electronic device 100 using speaker 106 and/or touch screen 108, such as to roll dice or spin a wheel.

Flowchart 200 also includes presenting, using a processor, at least a portion of the electronically integrated board game based on the touch input from the play area of the game board (action 272). For example, processor 102 can be used to present at least a portion of electronically integrated board game 156 based on touch input 114 from play area 122 of game board 120. Processor 102 can, for example, control any of speaker 106, touch screen 108, memory 104, display 146, display 147, and/or other electronics or components to present at least a portion of electronically integrated board game 156 based on touch input 114 from play area 122 of game board 120. As described above, processor 102 of electronic device 100 can present at least a portion of electronically integrated board game 156 based on at least one time interval between one touch input and another touch input from play area 122 of game board 120. Furthermore, processor 102 can associate the at least one time interval with a speed of a gesture by a player of electronically integrated board game 156.

As one example of the method illustrated by flowchart 200, electronically integrated board game 156 can be Monopoly®. In action 270, a player can swipe across the array of adjacent player contacts of touch input interface 128e to roll dice. FIG. 1D shows visual indicia situated over the array of adjacent player contacts. In action 272, processor 102 can display rolling dice on touch screen 108 in response to touch input 114 from action 270. In some implementations, the speed of the swipe is used to determine a result of the dice roll. Subsequently, in another instance of action 270, the player can place game piece 158a on a player contact corresponding to the result of the dice roll providing touch input to touch screen 108. Processor 102 can then use the touch input to determine whether game piece 158a is on the appropriate player contact (e.g. the appropriate region of play area 122) and update player data 118 to adjust the player's score.

As another example, the method illustrated by flowchart 200 can be utilized by processor 102 to store physical placement data of at least one of game pieces 158a and 158b over game board 120, for example, in player data 118 based on touch input from play area 122 (touch input from any of touch input interfaces 128). Thus, for example, in some implementations, players can take breaks from long play sessions and upon resuming game play, processor 102 can access player data 118 to allow for or to verify proper placement of game pieces based on touch input from at least one of touch input interfaces 128. For example, processor 102 can display a representation of game board 120 on touch screen 108 to illustrate proper placement of game pieces 158a and 158b. As another example, processor 102 can display a message on touch screen 108 to indicate improper placement of at least one of game pieces 158a and 158b.

Furthermore, in some implementations, the method illustrated by flowchart 200 can be utilized by processor 102 to track physical progression of at least one of game pieces 158a and 158b over game board 120 based on touch input from play area 122 (touch input from any of touch input interfaces 128). For example, processor 102 can track physical progression of at least one of game pieces 158a and 158b across a path on game board 120. Processor 102 may also store the physical placement data to track at least one of game pieces 158a and 158b across the path. The path can be formed by at least one of touch input interfaces 128.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. For example, many different types and styles of board games can be implemented utilizing concepts disclosed herein. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A game board for use with a tablet computer having a touch screen display, the game board comprising:
   an overlapping region that is configured to cover the touch screen display of the tablet computer;
   a touch input interface configured to route a touch input from a play area of the game board to the touch screen display of the tablet computer through the overlapping region;
   wherein the game board has an opening configured to expose the touch screen display of the tablet computer.

2. The game board of claim 1, wherein the overlapping region surrounds the opening of the game board.

3. The game board of claim 1, wherein the overlapping region of the game board includes a solar cell configured to receive power from light emitted by the touch screen display of the tablet computer.

4. The game board of claim 1 comprising a light interface configured to route light from the touch screen display of the tablet computer, through the overlapping region, to the play area of the game board.

5. The game board of claim 1 wherein the touch input interface comprises a player contact in the play area configured to receive the touch input, wherein the touch input interface is at least partially insulated from the touch input through the game board.

6. A method of using a game board with a tablet computer having a touch screen display, the method comprising:
   receiving, using the touch screen display of the tablet computer, a touch input through an overlapping region of the game board covering the touch screen display of the tablet computer;
   displaying, using the touch screen display of the tablet computer, game information in response to the touch input;
   wherein the touch screen display of the table computer is exposed through an opening of the game board.

7. The method of claim 6, wherein the overlapping region surrounds the opening of the game board.

8. The method of claim 6, wherein the displaying is based on at least one time interval between the touch input and another touch input from the play area of the game board.

9. The method of claim 8 further comprising:
   associating, using a processor of the table computer, the at least one time interval with a speed of a gesture by a player.

10. The method of claim 6 comprising:
    powering, using the touch screen display of the table computer, a solar cell of the game board.

11. An executable code stored in a memory of a tablet computer for execution by a processor of the tablet computer, the tablet computer having a touch screen display exposable through a plurality of openings of a game board, wherein when the executable code is executed by the processor performing a method comprising:
    dividing the touch screen display of the tablet computer into a plurality of display regions, wherein each of the plurality of display regions is exposable through each of the corresponding plurality of openings of the game board; and
    receiving a touch input from at least one of the plurality of display regions of the touch screen display of the tablet computer for playing the game board;
    wherein one of the plurality of display regions displays a wheel exposable through one of the plurality of openings of the game board.

12. The executable code of claim 11, wherein a first one of the plurality of display regions is associated with a first player, and a second one of the plurality of display regions is associated with second first player.

13. The executable code of claim 12, wherein a third one of the plurality of display regions is associated with a game menu.

14. The executable code of claim 11, wherein the processor is configured to determine a speed of spinning of the wheel based on a spinning gesture of a player touching the one of the plurality of display regions.

15. An executable code stored in a memory of a tablet computer for execution by a processor of the tablet computer, the tablet computer having a touch screen display exposable through a plurality of openings of a game board, wherein when the executable code is executed by the processor performing a method comprising:
  dividing the touch screen display of the tablet computer into a plurality of display regions, wherein each of the plurality of display regions is exposable through each of the corresponding plurality of openings of the game board; and
  receiving a touch input from at least one of the plurality of display regions of the touch screen display of the tablet computer for playing the game board;
  wherein one of the plurality of display regions displays a dice roll exposable through one of the plurality of openings of the game board.

* * * * *